(12) United States Patent
Jung et al.

(10) Patent No.: US 9,247,144 B2
(45) Date of Patent: Jan. 26, 2016

(54) MOBILE TERMINAL GENERATING A USER DIARY BASED ON EXTRACTED INFORMATION

(71) Applicant: LG ELECTRONICS INC., Seoul (KR)

(72) Inventors: Kwangsuh Jung, Seoul (KR); Jiwon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/015,579

(22) Filed: Aug. 30, 2013

(65) Prior Publication Data

US 2014/0063317 A1    Mar. 6, 2014

(30) Foreign Application Priority Data

Aug. 31, 2012 (KR) ........................ 10-2012-0096099
Oct. 18, 2012 (KR) ........................ 10-2012-0115924

(51) Int. Cl.
*H04N 5/225* (2006.01)
*H04N 5/232* (2006.01)
*G06F 17/30* (2006.01)

(52) U.S. Cl.
CPC ...... *H04N 5/23293* (2013.01); *G06F 17/30265* (2013.01); *G06F 17/30743* (2013.01); *G06F 17/30038* (2013.01)

(58) Field of Classification Search
CPC ................................................. H04N 5/23293
See application file for complete search history.

(56) References Cited

U.S. PATENT DOCUMENTS

| 2007/0236583 | A1 | 10/2007 | Vuong et al. |
| 2008/0263067 | A1* | 10/2008 | Diederiks et al. ............. 707/100 |
| 2011/0314482 | A1* | 12/2011 | Cupala et al. ................. 719/328 |
| 2013/0225236 | A1* | 8/2013 | Lee et al. .................... 455/556.1 |
| 2013/0226850 | A1* | 8/2013 | Hannuksela et al. ........... 706/14 |

FOREIGN PATENT DOCUMENTS

| EP | 1 988 694 A1 | 11/2008 |
| WO | WO 2007/004139 A2 | 1/2007 |
| WO | WO 2008/106666 A2 | 9/2008 |
| WO | WO 2012/001216 A1 | 1/2012 |

* cited by examiner

*Primary Examiner* — Twyler Haskins
*Assistant Examiner* — Dwight C Tejano
(74) *Attorney, Agent, or Firm* — Birch, Stewart, Kolasch & Birch, LLP

(57) ABSTRACT

A mobile terminal including a memory; a wireless communication unit configured to wirelessly connect with at least one other terminal; a camera configured to capture an image; a display unit; an audio output module configured to output an audio file; a microphone configured to obtain sound information; and a controller. The controller is configured to capture an image using the camera, search for an audio file corresponding to sound information obtained through the microphone when capturing the image using the camera, set information related to the searched audio file as an audio file corresponding to the captured image, and output the searched audio file to the audio output module when displaying the captured image on the display unit.

14 Claims, 25 Drawing Sheets

FIG. 10
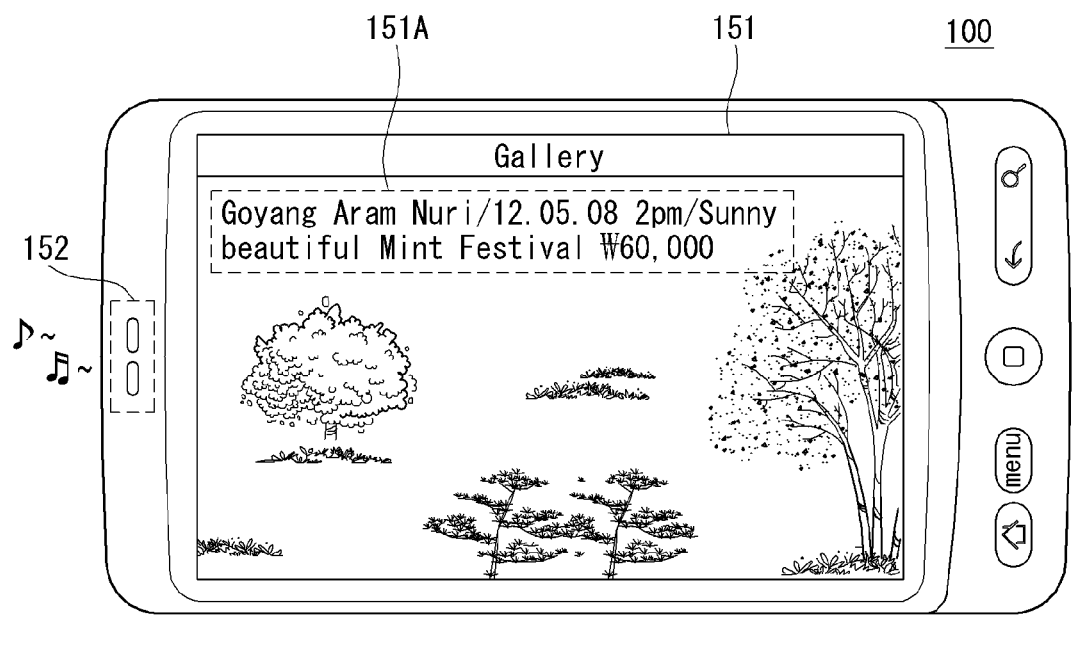
(a)
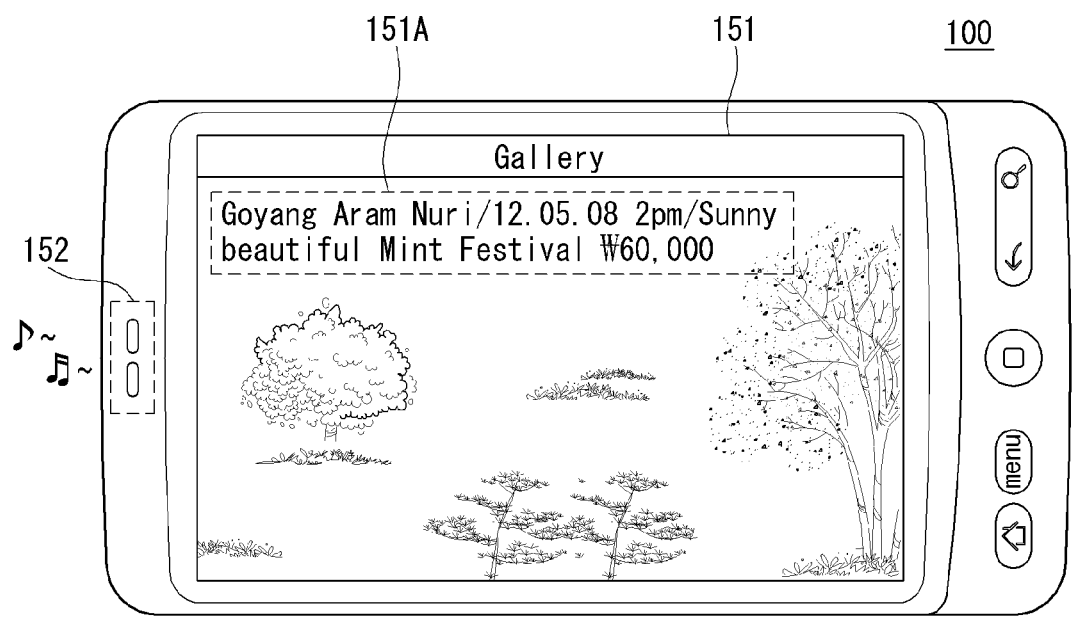
(b)

FIG. 15
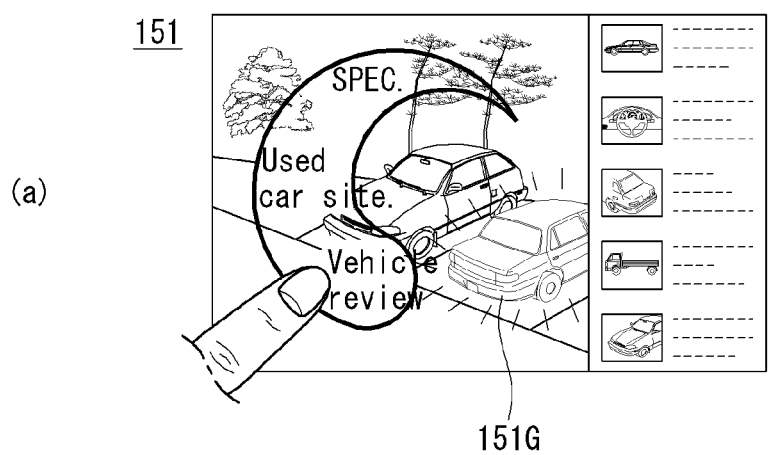
(a)
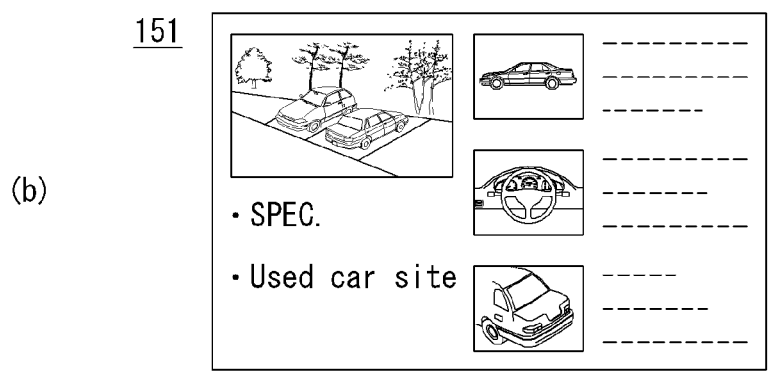
(b)

(a)
```
PLACE LIST ▼

Hongik University          Song title —. Singer —.

Shinchon Station           Song title —. Singer —.

Shillim Grape Mall         Song title —. Singer —.

Seoul Nat'l Univ. Station  Song title —. Singer —.

Recommended music ▶▶
```

⇩ When selected, move to recommended music

151

(b)
```
Recommended music

Shillim Grape Mall       Relate song ① —. Singer —.
                           Relate song ② —. Singer —.

Hongik University        Relate song ① —. Singer —.
  parking lot              Relate song ② —. Singer —.
                           Relate song ② —. Singer —.

Gasan Digital            Relate song ① —. Singer —.
  Complex Station          Relate song ② —. Singer —.
```

FIG. 21
(a)
151
MONEY ▼
Today      ₩_____.   
This week  ₩_____.   
One month  ₩_____.   
(b)
151
WISH ▼
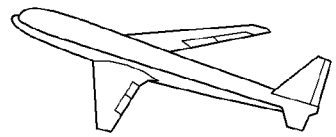
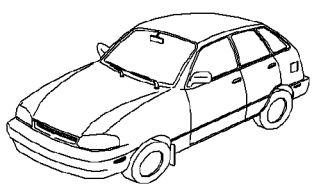
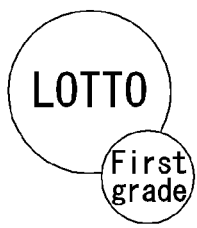

FIG. 23A

| Date | July 20 | | Weather | Cloud |
|---|---|---|---|---|
| Departed from Subway Line 3 Yangjae Station at 7.05 a.m. ||||
| Heard Yeosu night see and spring wind from Busker Busker at 7.10. a.m. ||||
| Received call for camera issue from someone and had lots of mixed emotions at 7.30. a.m. ||||
| Received message for win for luck ticket from someone at 7.38. a.m. ||||
| Arrived at Subway Line 7 Gasan Digital Complex Station at 7.50. a.m. ||||
| Called someone regarding change of camera software structure at 2.25. p.m. ||||
| Attended weekly report conference at 4.00. p.m. ||||
| Departed from Subway Line 7 Gasan Digital Complex Station at 6.30. p.m. ||||
| Arrived at Subway Line 2 Gangnam Station at 7.20. p.m. ||||
| Received call for regular meeting from someone and felt good at 7.25. p.m. ||||
| Was near Yeoksam Station at 8.00. p.m. ||||
| Departed from Teheran Station by Bus 1438 at 10.05. p.m. ||||
| Arrived at Yangjae Station by Bus 1438 at 10.25. p.m. ||||

FIG. 23B

| Date | July 20 | | Weather | Cloud |
|---|---|---|---|---|
| [Place movement] 7.05 a.m., Subway Line 3, Departure from Yangjae Station |||||
| 7.50. a.m., Subway Line 7, Arrival at Gasan Digital Complex Station ||||||
| 6.30. p.m., Subway Line 7, Departure from Gasan Digital Complex Station ||||||
| 7.20. p.m., Subway Line 2, Arrival at Gangnam Station ||||||
| 8.00. p.m., near Yeoksam Station ||||||
| 10.05. p.m., Bus 1438, Departure from Teheran Station ||||||
| 10.25. p.m., Bus 1438, Arrival at Yangjae Station ||||||
| [Play media file] 7.10. a.m., play Yeosu night see and spring wind from Busker Busker ||||||
| [Call] 7.30. a.m., received call for camera issue from someone and had lots of mixed emotions ||||||
| 2.25. p.m., make call someone regarding change of camera software structure ||||||
| 7.25. p.m., received call for regular meeting from someone and felt good ||||||
| [Message] 7.38. a.m., received message for win for luck ticket from someone ||||||
| [Calendar] 4.00. p.m., Attended weekly report conference ||||||

MOBILE TERMINAL GENERATING A USER DIARY BASED ON EXTRACTED INFORMATION

CROSS-REFERENCE TO RELATED APPLICATIONS

Pursuant to 35 U.S.C. §119(a), this application claims the benefit of earlier filing date and right of priority to Korean Patent Applications No. 10-2012-0096099, filed on Aug. 31, 2012 and No. 10-2012-0115924, filed on Oct. 18, 2012, the contents of both which are incorporated by reference herein in their entirety

BACKGROUND OF THE INVENTION

1. Field of the Invention

The present invention relates to a mobile terminal and, more particularly, to a mobile terminal, which provides a diary function or can perform various functions using information obtained when capturing an image using a camera.

2. Description of the Related Art

In general, a mobile terminal is a mobile device configured to be portable and equipped with one or more of a voice and video call function, an information input/output function, and a data storage function.

Recently, as the functions of the mobile terminal are diversified with the diffusion of smart devices, such as smart phones, the mobile terminal is equipped with complicated functions, such as the photographing of photos or moving images, the playing of music or moving image files, gaming, and the reception of broadcasting, and is evolved into a complex multimedia player.

SUMMARY OF THE INVENTION

An object of the present invention is to provide a mobile terminal capable of performing a diary function for processing mobile terminal use information of a user in a diary form and displaying the processed mobile terminal use information to the user.

Another object of the present invention is to provide a mobile terminal in which information desired by a user can be added to an object included in a captured image.

Yet another object of the present invention is to provide a mobile terminal capable of performing a search function for an object included in a stored image when the object is selected by a user.

In order to achieve the above objects, a diary providing apparatus in a mobile terminal may include a first providing unit configured to provide mobile terminal use information, a first storage unit configured to store the mobile terminal use information, and a control unit configured to write the diary of a user using information provided by the first providing unit and information stored in the first storage unit.

In an embodiment of the present invention, the first providing unit may include a second providing unit for providing information about the location of the mobile terminal, a third providing unit for providing transportation card use information of the user through a transportation card function using near field communication, a fourth providing unit for providing information related to a voice call, and a fifth providing unit for providing information related to a message.

In an embodiment of the present invention, the fourth providing unit may include a sixth providing unit for recognizing a feeling of the user based on a voice tone of the user in the voice call and providing feeling information and a seventh providing unit for recognizing a keyword in the voice call and providing keyword contents information.

In an embodiment of the present invention, the fifth providing unit may include an eight providing unit for extracting a keyword from the message and providing the extracted keyword and a ninth providing unit for providing message information about the message.

In an embodiment of the present invention, the first storage unit may include a second storage unit for storing call information about a voice call, a third storage unit for storing message information about a message, and a fourth storage unit for storing calendar information, weather information, website use information, and media play information.

In an embodiment of the present invention, the diary providing apparatus may further include a display unit configured to display the diary.

In an embodiment of the present invention, the control unit may control the display unit so that the diary is displayed in order of the time.

In an embodiment of the present invention, the control unit may control the display unit so that the diary is displayed according to categories based on information.

In an embodiment of the present invention, the control unit may control the display unit so that an icon indicative of a category based on information is displayed.

A mobile terminal in accordance with an embodiment of the present invention may include a memory, a wireless communication unit, a camera, a display unit, an audio output module, a microphone, and a controller. The controller may search for an audio file corresponding to sound information obtained through the microphone when capturing an image using the camera and set information related to the retrieved audio file as an audio file corresponding to the captured image and may output the retrieved audio file to the audio output module when displaying the captured image on the display unit.

A mobile terminal in accordance with another embodiment of the present invention may include a memory, a wireless communication unit, a camera, a display unit, an audio output module, a microphone, and a controller. The controller may convert voice information, obtained through the microphone, into text when capturing an image using the camera, match the converted text with the captured image, store the matched text in the memory along with the captured image and may display the stored text on the display unit along with the captured image when displaying the captured image on the display unit.

A mobile terminal in accordance with yet another embodiment of the present invention may include a display unit, a memory configured to store a specific image and a keyword list for a specific object included in the specific image, and a controller configured to display the keyword list for the specific object on the display unit when the specific image is outputted through the display unit and the specific object is selected, perform a search related to the specific object using the specific keyword when the specific keyword is selected from the keyword list, and display results of the search on the display unit.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 10 is a display screen illustrating an example in which a captured image is played according to the image capturing method of FIG. 9;

FIG. 15 is a diagram showing an example in which information stored according to the image edit method of FIG. 11 is provided to a user;

FIGS. 16 to 21 is a diagram showing examples in which various types of information obtained based on images captured and stored by the mobile terminal according to embodiments of the present invention are provided to a user;

FIG. 23A is a diagram showing an example in which a diary was written in order of the time, and FIG. 23B is a diagram showing an example in which the diary was written according to categories.

DETAILED DESCRIPTION OF THE EMBODIMENTS

Embodiments of the present invention will now be described more fully with reference to the accompanying drawings, in which exemplary embodiments of the invention are shown. The invention may, however, be embodied in many different forms and should not be construed as being limited to the embodiments set forth herein; rather, the embodiments are provided so that this disclosure will be thorough and complete, and will fully convey the concept of the invention to those skilled in the art.

Hereinafter, a mobile terminal relating to embodiments of the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
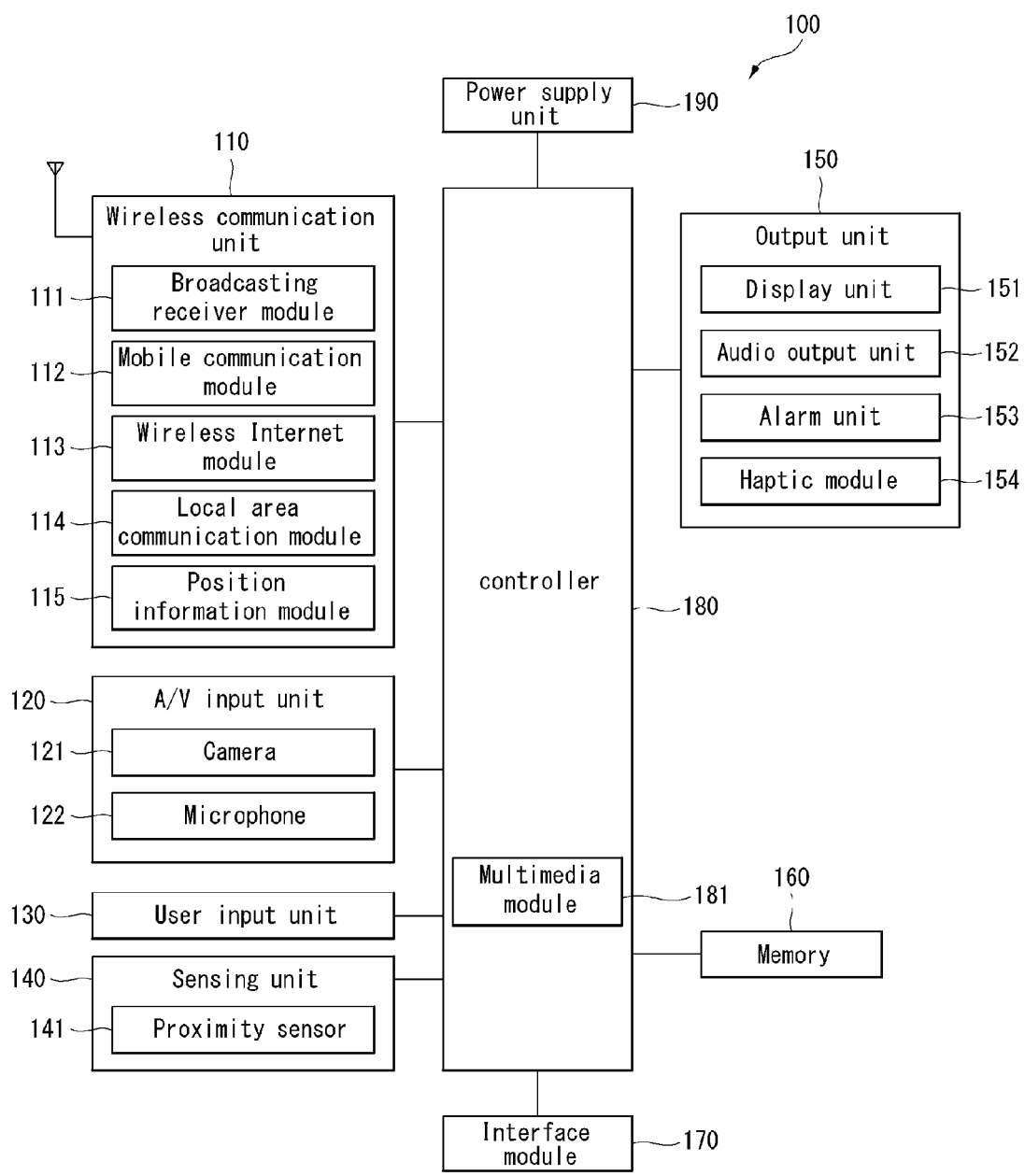
FIG. 1 is a block diagram of a mobile terminal in accordance with an embodiment of the present invention.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface unit 170, a controller 180, and a power supply unit 190. The number of components included in the mobile terminal can be varied.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the position information module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the position information module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply unit 190 supplies power and whether the interface unit 170 is connected to an external device. The sensing unit 140 can include a proximity sensor 141.

The output unit 150 generates visual, auditory or tactile output and can include the display unit 151, an audio output module 152, an alarm module 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

When the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor 141 senses an object approaching a predetermined sensing face or an object located near the proximity sensor 141 using electromagnetic force or infrared rays without having mechanical contact. The proximity sensor 141 has a lifetime longer than that of a contact sensor and has wide application.

The proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor 141 senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface unit 170 serves as a path to all external devices connected to the mobile terminal 100. The interface unit 170 receives data from the external devices or power and transmits the data or power to the internal components of the mobile terminal 100 or transmits data of the mobile terminal 100 to the external devices.

The interface unit 170 can include a wired/wireless headset port, an external charger port, a wired/wireless data port, a memory card port, a port for connecting a device having a user identification module, an audio (input/output) I/O port, a video I/O port, an earphone port, etc., for example.

An identification module is a chip that stores information for authenticating the authority to use the mobile terminal 100 and can include a user identify module (UIM), a subscriber identity module (SIM) and a universal subscriber identity module (USIM). A device (referred to as an identification device hereinafter) including the identification module can be manufactured in the form of a smart card. Accordingly, the identification device can be connected to the mobile terminal 100 through a card slot included in the interface unit 170.

The controller 180 can perform a pattern recognition process capable of recognizing handwriting input or picture-drawing input applied to the touch screen as characters or images.

The power supply unit 190 receives external power and internal power and provides power required for the operations of the components of the mobile terminal under the control of the controller 180.

Various embodiments of the inventive concept can be implemented in a computer or similar device readable recording medium using software, hardware or a combination of hardware and software, for example.

According to a hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to a software implementation, embodiments such as procedures or functions can be implemented with a separate software module executing at least one function or operation. Software codes can be implemented according to a software application written in an appropriate software language. Furthermore, the software codes are stored in the memory 160 and executed by the controller 180.

Figure 2:
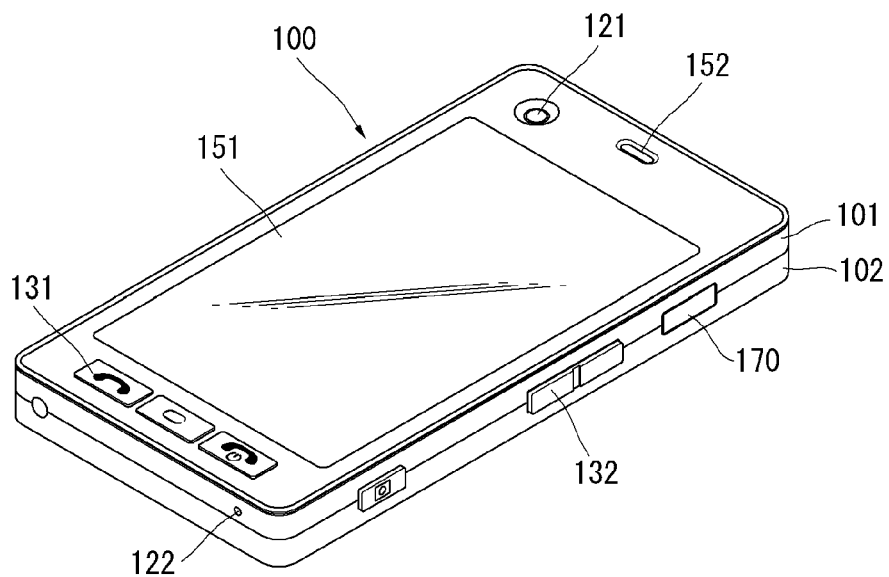
FIG. 2 a is front perspective view of the mobile terminal according to an embodiment of the present invention.

Next, FIG. 2 a front perspective view showing the mobile terminal 100 according to an embodiment of the present invention is seen from the front. The mobile terminal 100 includes a bar type terminal body. Embodiments of the mobile terminal can be implemented in a variety of different configurations. Examples of such configurations include a folder type, a slide type, a bar type, a rotational type, a swivel type and/or combinations thereof.

The body includes a casing (or housing or cover) that forms the exterior of the terminal. The casing can be divided into a front casing 101 and a rear casing 102. Various electric and electronic parts can be provided in the space between the front casing 101 and the rear casing 102. Middle casings can be further provided between the front casing 101 and the rear casing 102.

The casings can be formed by injection molding of synthetic resin or may be made of metallic materials, such as stainless steel (STS) or titanium (Ti).

The display unit 151, the audio output module 152, the camera 121, user input units 130 (131, 132), the microphone 122, the interface unit 170 and the like can be provided on the terminal body, and more particularly in the front casing 101.

The display unit 151 occupies most of the main face of the front casing 101. The audio output module 152 and the camera 121 are disposed at an area adjacent to one end portion of the display unit 151, whereas the user input unit 131 and the microphone 122 can be disposed at another area adjacent to the other end portion of the display unit 151. The user input unit 132 and the interface unit 170 are disposed on the lateral sides of the front and rear casings 101 and 102.

The user input unit 130 receives commands for controlling the operation of the mobile terminal 100. The user input unit 130 can include a plurality of the manipulating units 131 and 132. The manipulating units 131 and 132 can be generally called manipulating portions and can adopt any mechanism of a tactile manner that enables a user to perform a manipulation action by experiencing a tactile feeling.

Contents input by the first and the second manipulating units 131 and 132 can be diversely set. For example, commands, such as start, end, and scroll, can be input to the first manipulating unit 131. A command for adjusting the volume of sound output from the audio output module 152 and a command for switching mode of the display unit 151 to a touch recognizing mode can be input to the second manipulating unit 132.

Figure 3:
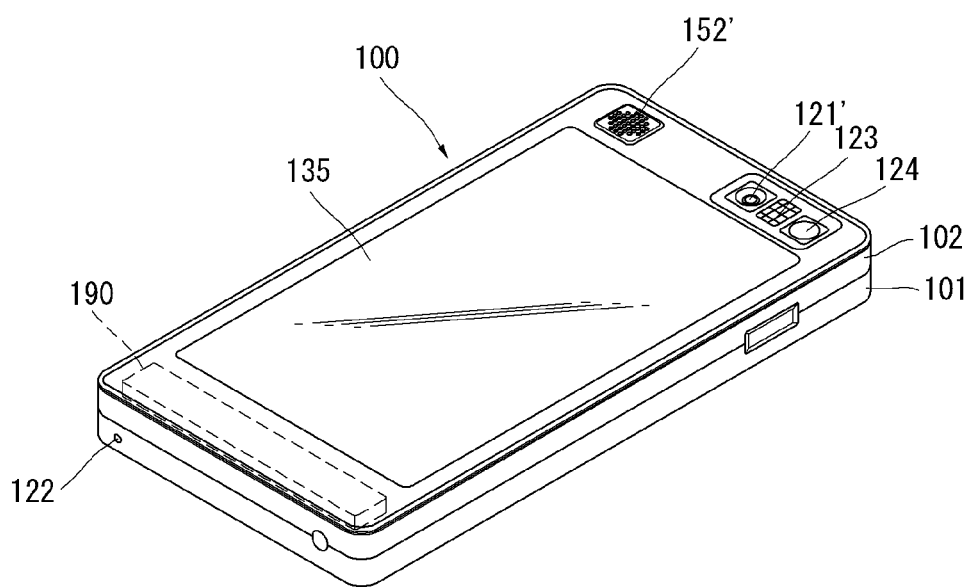
FIG. 3 is a rear perspective view of the mobile terminal shown in FIG. 2.

Next, FIG. 3 is a rear perspective view of the mobile terminal 100 shown in FIG. 2. Referring to FIG. 3, a camera 121' can be additionally mounted on the backside of the terminal body, and more particularly, on the rear casing 102. The camera 121' has a photographing direction that is substantially opposite to a photographing direction of the camera 121 (shown in FIG. 2) and may have pixels different from those of the camera 121.

For example, the camera 121 may have a lower number of pixels to capture and transmit a picture of user's face for a video call, whereas the camera 121' may have a greater number of pixels for capturing a common subject for photography without transmitting the captured subject. Each of the cameras 121 and 121' may be installed in the terminal body in such a way as to be rotated or popped up.

A flash 123 and a mirror 124 are additionally provided adjacent to the camera 121'. The flash 123 projects light toward a subject when the subject is photographed using the camera 121'. If a user attempts to take a picture of the user (self-photography) using the camera 121', the mirror 124 enables the user to view a user's face reflected by the mirror 124. Hereinafter, the camera 121' for photographing an object in front of the mobile terminal 100 is called a front camera, and the camera 121 for photographing an object in the rear of the mobile terminal 100 is called a rear camera.

An additional audio output module 152' may be provided on the backside of the terminal body. The additional audio output module 152' can implement a stereo function along with the audio output module 152 shown in FIG. 2A and may be used for implementation of a speakerphone mode when talking over the terminal.

A broadcast signal receiving antenna 124 can be additionally provided on the lateral side of the terminal body in addition to an antenna for communication. The antenna 124 that forms a portion of the broadcast receiving module 111 (refer to FIG. 1) can be retractably provided on the terminal body.

The power supply unit 190 for supplying power to the mobile terminal 100 can be provided to the terminal body. The power supply unit 190 is embedded within the terminal body. Alternatively, the power supply unit 190 may be detachably connected to the terminal body.

A touch pad 135 for detecting a touch can be additionally provided on the rear casing 102. The touch pad 135 can be configured in a light transmittive type like the display unit 151. If the display unit 151 is configured to output visual information from both faces, the visual information may also be recognized through the touch pad 135. The information outputted from both the faces may be controlled by the touch pad 135. Alternatively, a display can be further provided to the touch pad 135 so that a touch screen may also be provided to the rear casing 102.

The touch pad 135 can be activated while operating in conjunction with the display unit 151 of the front casing 101. The touch pad 135 can be provided in rear of the display unit 151 in parallel to each other. The touch pad 135 can have a size equal to or less than the display unit 151.

The construction of the mobile terminal 100 according to an embodiment of the present invention has been described above with reference to FIGS. 1 to 3. Hereinafter, an image capturing function and an image edit function performed in the mobile terminal 100 in accordance with some embodiments of the present invention are described in detail with reference to FIGS. 4 to 21.

Figure 4:
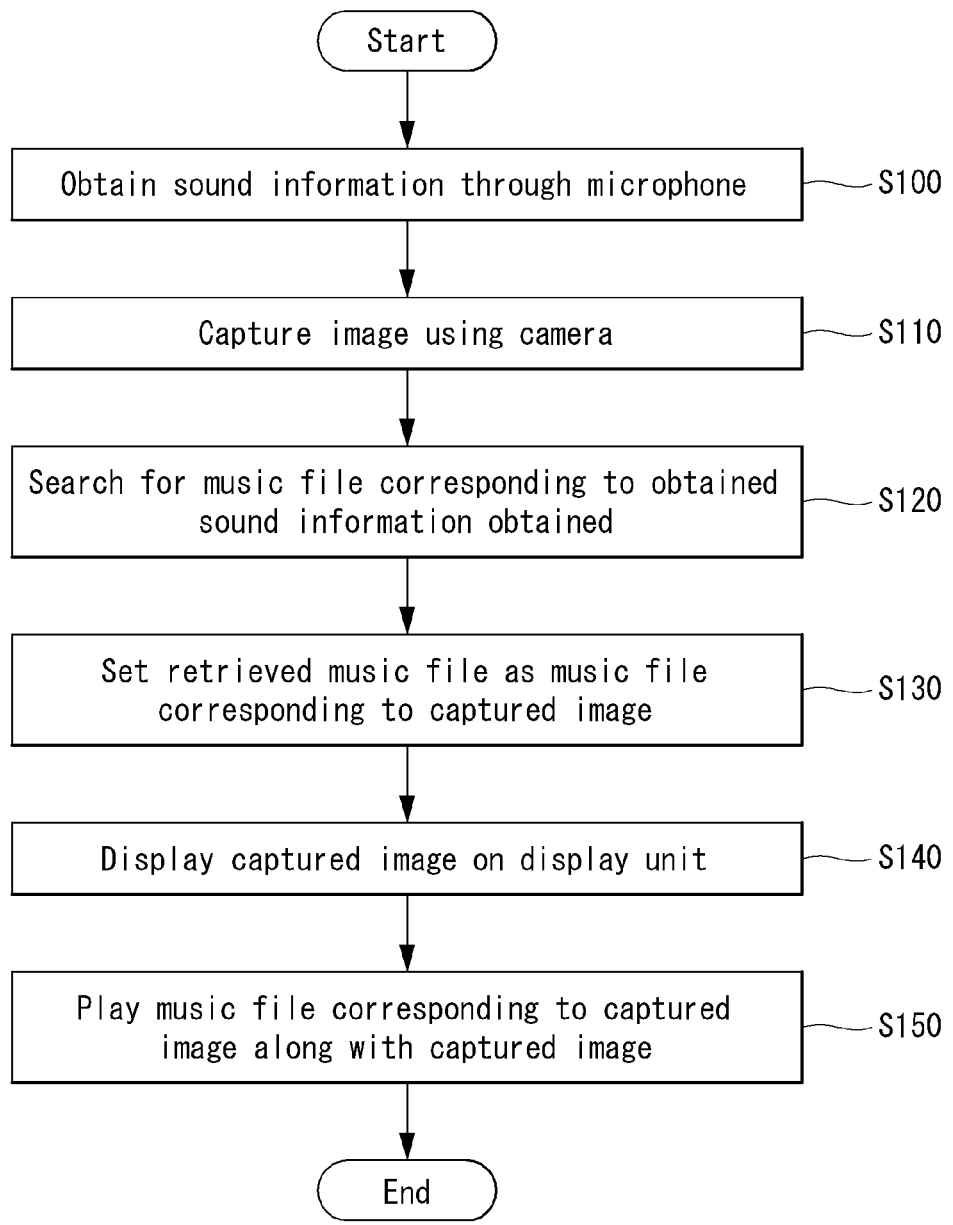
FIG. 4 is a flowchart illustrating an image capturing method performed in the mobile terminal according to an embodiment of the present invention.

In particular, FIG. 4 is a flowchart illustrating an example of an image capturing method performed in the mobile terminal 100 according to an embodiment of the present invention.

When the function of the camera 121 is activated in order to capture an image, the controller 180 activates the function of the microphone 122 and obtains surrounding sound information by the microphone 122 (S100). Here, the image can include a moving image as well as a still image (i.e., photo).

Thereafter, the controller 180 captures an image through the camera 121 based on a manipulation of a user (S110). Here, the controller 180 searches for an audio file corresponding to the sound information obtained by the microphone 122 (S120).

The audio file corresponding to the obtained sound information may be a file itself for a specific song or musical performance if the obtained sound information is the specific song or musical performance, may be a file for a song or music including the humming melodies of people around the mobile terminal 100, or may be a song or musical performance file corresponding to a specific word that is included in voice information given by people around the mobile terminal 100. In a more detailed example, if a photo is taken in a café in which "national anthem" is played, the controller 180 can search for an audio file corresponding to "national anthem." However, the scope of the present invention is not limited to the aforementioned examples.

Meanwhile, the controller 180 can search files within the mobile terminal 100 for an audio file, or the range that the controller 180 search for a specific file may be extended to the outside of the mobile terminal 100. For example, the controller 180 can search the memory 160 of the mobile terminal 100 for the audio file corresponding to the obtained sound information or can search the Internet, accessed thereto through the wireless communication unit 110, for the audio file corresponding to the obtained sound information. However, the range that the mobile terminal 100 searches for the audio file is not limited to the aforementioned examples.

Meanwhile, the sound information used to search for the audio file is limited to a specific time range anterior and posterior to the time when an image is captured. For example, the controller 180 can search for an audio file based on sound information obtained for five seconds before an image is captured.

Referring back to FIG. 4, when the audio file corresponding to the obtained sound information is searched for, the controller 180 sets the retrieved audio file as an audio file corresponding to the captured image (S130). Here, if the retrieved audio file is stored in the memory 160, the controller 180 designates the retrieved audio file as an audio file corresponding to the captured image without performing an additional storage operation.

If the retrieved audio file has been searched for over the Internet, the controller 180 can download the retrieved audio file and store the downloaded audio file corresponding to the captured image in the memory 160. Here, the controller 180 can set the retrieved audio file as an audio file corresponding to the captured image by setting up a link between the captured image and the audio file.

After setting the retrieved audio file as the audio file corresponding to the captured image, the controller 180 plays the captured image through the display unit 151 in response to a manipulation of a user (S140). Here, the controller 180 plays the retrieved audio file, set as the audio file corresponding to the captured image, through the audio output module 152 (S150).

For example, if the retrieved audio file is stored in the memory 160, the controller 180 has only to play the file stored in the memory 160. If a network address of the audio file corresponding to the captured image is linked to the captured image, the controller 180 can access the network address and output the corresponding audio file through the audio output module 152.

Figure 5:
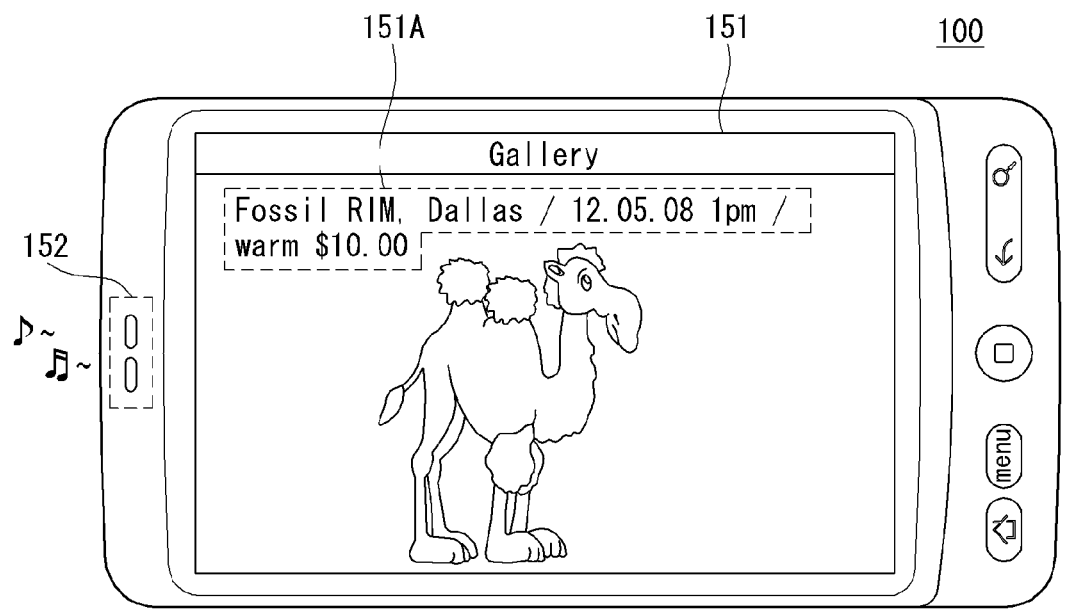
FIG. 5 is a display screen illustrating an example in which a captured image is played according to the image capturing method of FIG. 4.

Next, FIG. 5 is a display screen illustrating an example in which a captured image is played according to the image capturing method of FIG. 4. FIG. 5 illustrates that an audio file corresponding to the captured image is played through the audio output module 152 when the captured image is played in a gallery application.

Furthermore, various types of information 151A obtained when the image was captured can be displayed in the captured image. As shown in FIG. 5, the information 151A can include a photographing place, a photographing time, the weather when the image was captured, and a cost in the photographing place. However, information matched with an image and stored when the image was captured is not limited to the aforementioned examples.

Figure 6:
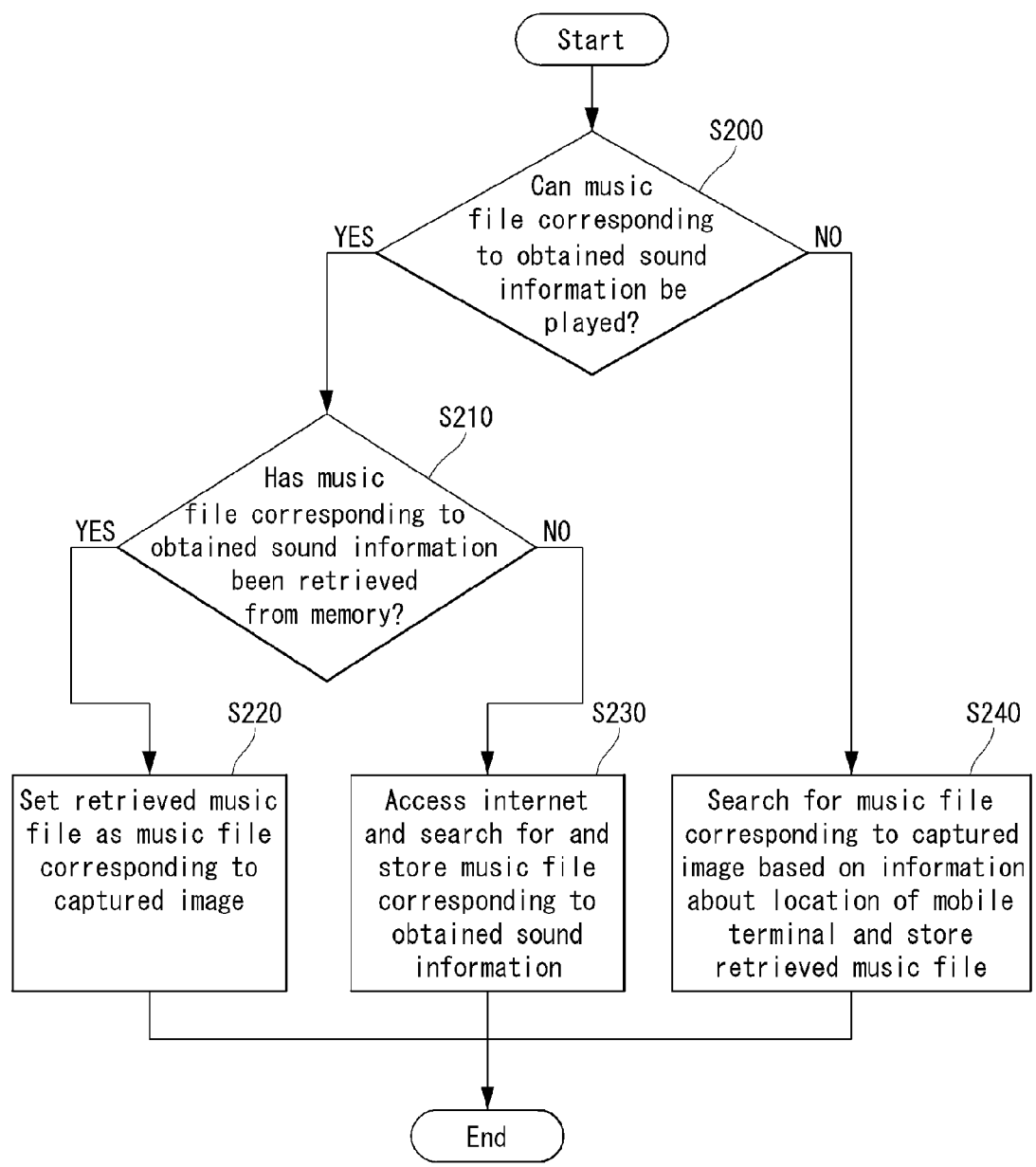
FIG. 6 is a display screen illustrating an example in which steps S120 and S130 are performed in the image capturing method of FIG. 4.

FIG. 6 is a flow chart illustrating an example in which steps S120 and S130 are performed in the image capturing method of FIG. 4. As shown, the controller 180 determines whether or not an audio file corresponding to sound information obtained through the microphone 122 can be searched for based on the sound information (S200). If, an audio file cannot be searched for, it may correspond to a case where only simple noise was obtained or a case where factors necessary to search for the audio file have not been detected in the obtained sound information.

If an audio file corresponding to the obtained sound information can be searched for (yes in S200) the controller 180 searches the memory 160 and determines whether or not the audio file is retrieved from the memory 160 (S210). If, the audio file corresponding to the obtained sound information is retrieved from the memory 160 (yes in S210), the controller 180 sets the retrieved audio file as an audio file corresponding to a captured image (S220).

If the audio file corresponding to the obtained sound information is not retrieved from the memory 160 (no in S210), the controller 180 accesses the Internet through the wireless communication unit 110, searches for an audio file corresponding to the obtained sound information, and stores the retrieved audio file (S230).

If an audio file corresponding to the obtained sound information cannot be searched for (no in S200), the controller 180 searches for an audio file, corresponding to the captured image, based on information about the location of the mobile terminal 100 and stores the retrieved audio file (S240).

In addition, the range that the audio file is searched for may be limited within the mobile terminal 100 or may be extended over a network to which the mobile terminal 100 can be connected. For example, if the location of the mobile terminal 100 is confirmed, the controller 180 can search for a previously registered audio file over the Internet based on the type of a place where the mobile terminal 100 is placed.

In a more detailed example, if the location of the mobile terminal 100 is in a café, the controller 180 can access a service server for storing an audio file previously registered based on the type of a place, the café, and searches for the audio file corresponding to the café. Meanwhile, if a plurality of audio files corresponding to the café is searched for, the controller 180 may display a user interface for selecting at least one of the plurality of audio files on the display unit 151.

In another detailed example, if the administrator of a specific café where the mobile terminal 100 is placed has previously registered a specific audio file as an audio file corresponding to the specific café, the controller 180 can search for the specific audio file previously registered by the administrator of the specific café and set the retrieved audio file as an audio file corresponding to an image that is captured in the specific cafe.

In yet another detailed example, if the location of the mobile terminal 100 is a specific café and another user has previously registered a specific audio file as an audio file corresponding to the specific café, the controller 180 can search for the specific music previously registered by another user and set the retrieved audio file as an audio file corresponding to an image that is captured in the specific cafe.

Figure 7:
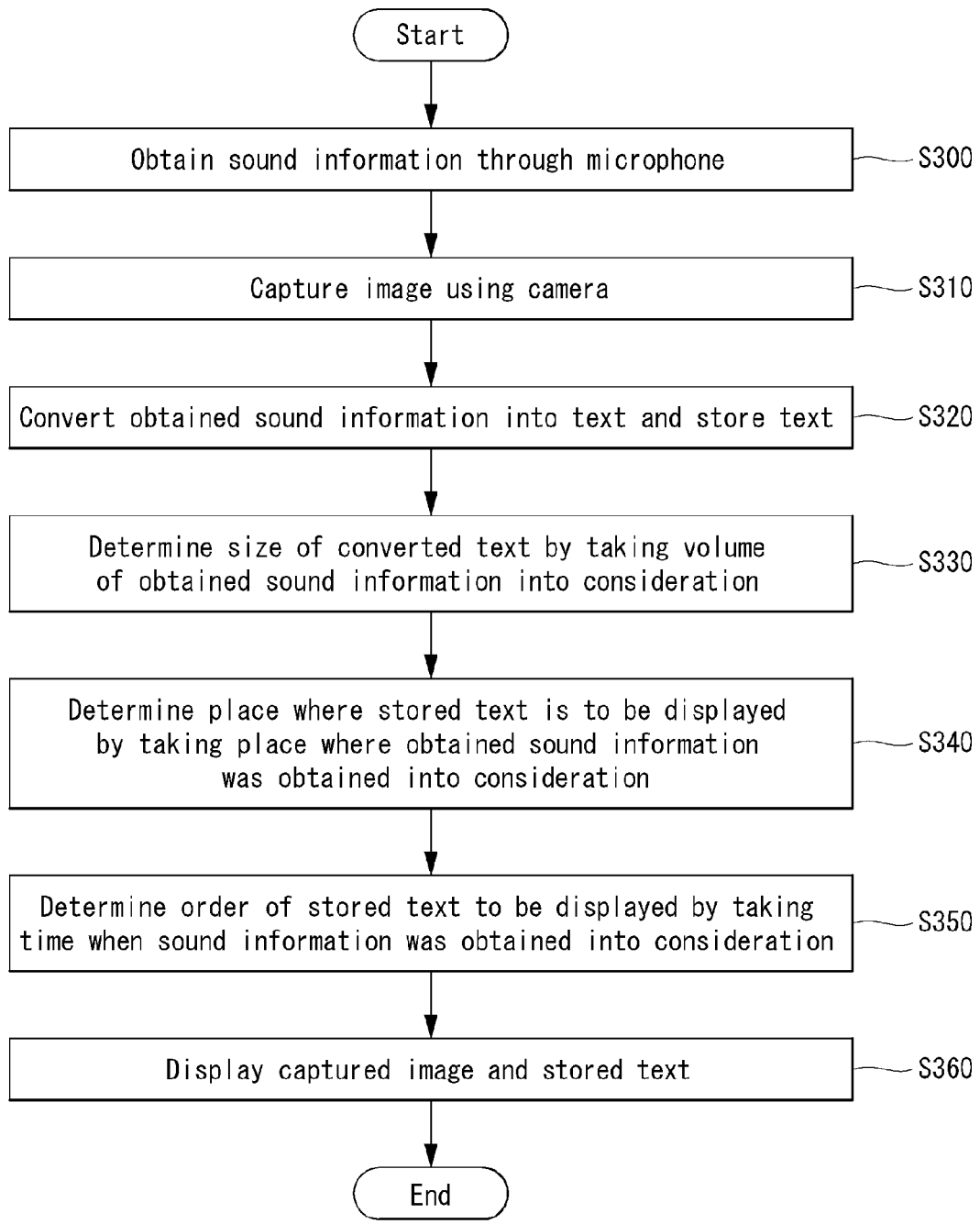
FIG. 7 is a flowchart illustrating another example of an image capturing method that is performed in the mobile terminal according to an embodiment of the present invention.

Next, FIG. 7 is a flowchart illustrating another example of an image capturing method performed in the mobile terminal 100 according to an embodiment of the present invention.

When the function of the camera 121 is activated in order to capture an image, the controller 180 activates the function of the microphone 122 and obtains voice information of surrounding people through the microphone 122 (S300). Thereafter, the controller 180 captures an image using the camera 121 based on a manipulation of a user (S310).

The controller 180 converts the obtained voice information into text and stores the converted voice information (S320). Meanwhile, the converted voice information is limited to a specific time range anterior and posterior to the time when the image was captured. For example, the controller 180 can convert only voice information, obtained for five seconds before an image was captured, into text and store the converted voice information.

The controller 180 determines the size of the converted text by incorporating the volume of the obtained voice information into the size (S330). For example, the controller 180 can increase the size of the converted text according to an increase in the volume of a voice signal. A unit into which the volume of the voice information is incorporated may be one sentence, one word phrase, or one letter.

Thereafter, the controller 180 determines a location of the display unit 151 at which the stored text will be displayed by incorporating a location where the voice information was obtained into the location of the display unit 151 (S340). For example, the controller 180 can determine the up and down locations of the display unit 151 at which the stored text will be displayed by incorporating the far and near of the obtained location into the up and down locations and determine the left and right locations of the display unit 151 at which the stored text will be displayed by incorporating the left and right orientation of the obtained location into the left and right locations.

Thereafter, the controller 180 determines the order that the stored text will be displayed on the display unit 151 by incorporating the time when the voice information was obtained into the order (S350). For example, the controller 180 can determine order of the display so that text based on voice information first obtained is displayed on the display unit 151.

If the captured image is played through the display unit 151 in response to a manipulation of a user, the controller 180 also displays the stored text in the display unit 151 (S360). The size, location, and display order displayed on the display unit 151 are determined at steps S330 to S350.

Figure 8:
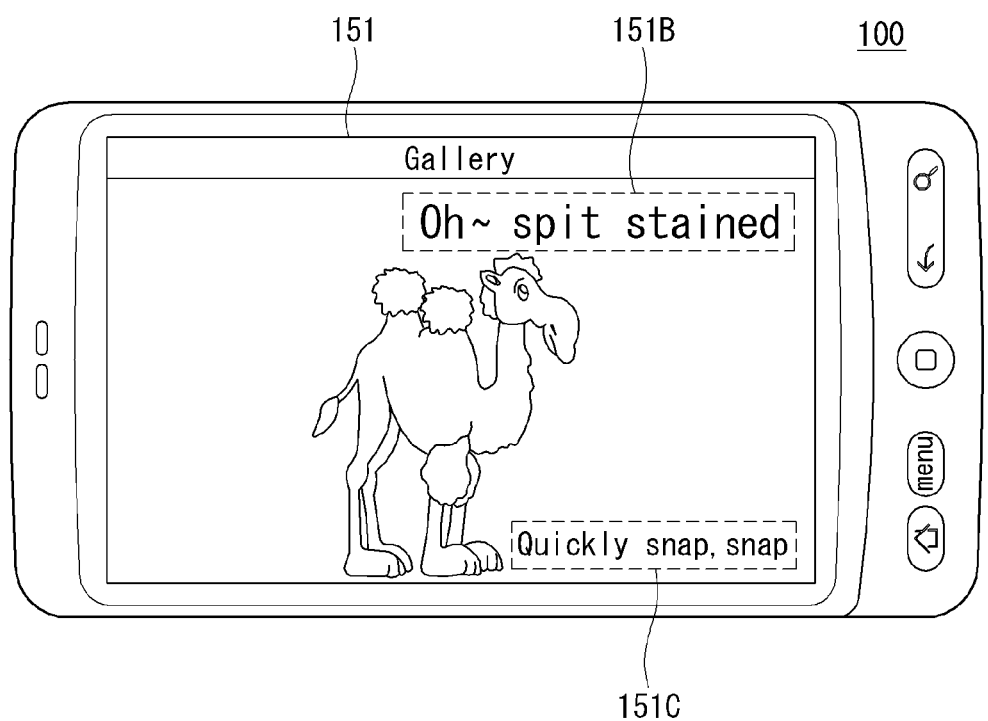
FIG. 8 is a display screen illustrating an example in which a captured image is played according to the image capturing method of FIG. 7.

Next, FIG. 8 is a display screen illustrating an example in which a captured image is played according to the image capturing method of FIG. 7. FIG. 8 illustrates the captured image is played through the display unit 151 and text groups 151B and 151C converted based on voice information obtained when the image was captured are also displayed on the display unit 151.

Meanwhile, the sizes of text included in the text groups 151B and 151C differ from each other to illustrate the volumes of pieces of corresponding voice information differ from each other. FIG. 8 shows that the volume of voice information corresponding to "Oh~ spit stained . . . " is greater than the volume of voice information corresponding to "Quickly snap, snap!."

Furthermore, the locations of the text groups 151B and 151C differ from each other to illustrate the locations where pieces of corresponding voice information were obtained differ from each other. FIG. 8 shows that the location where the voice information corresponding to "Oh~ spit stained . . . " is farther than the location where the voice information corresponding to "Quickly snap, snap!" was obtained.

Although FIG. 8 illustrates that the text groups 151B and 151C are displayed on the display unit 151 at the same time, the text groups may be sequentially displayed on the display unit 151 in order that the pieces of voice information corresponding to the text groups 151B and 151C are obtained.

Figure 9:
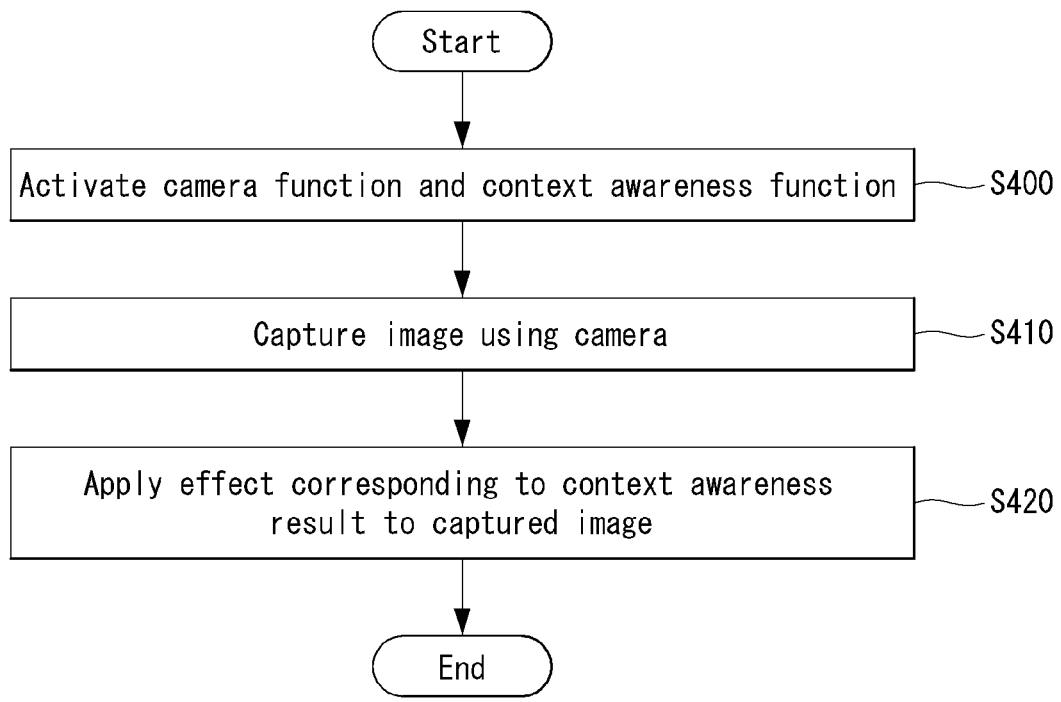
FIG. 9 is a flowchart illustrating yet another example of an image capturing method that is performed in the mobile terminal according to an embodiment of the present invention.

Next, FIG. 9 is a flowchart illustrating yet another example of an image capturing method that is performed in the mobile terminal 100 according to an embodiment of the present invention.

When the function of the camera 121 is activated in order to capture an image, the controller 180 activates a context awareness function (S400). Information obtained for context awareness can include an image captured by the camera 121, sound information obtained by the microphone 122, information about the location of the mobile terminal 100, a heart rate of a user, vibration sensed by the mobile terminal 100, surrounding brightness, and weather. However, the scope of the present invention is not limited to the aforementioned examples.

Thereafter, the controller 180 captures an image using the camera 121 in response to a manipulation of a user (S410). The controller 180 applies an effect, corresponding to a context awareness result, to the captured image (S420). The context awareness result may be the information itself obtained at step S400 or may be a feeling of a user or a surrounding atmosphere that is determined based on the obtained information. Meanwhile, the effect applied to the captured image can include the application of a filter into which a feeling of a user has been incorporated and a color tone or a change of light and darkness of the captured image. However, the scope of the present invention is not limited to the aforementioned examples.

FIG. 10 is a display screen illustrating an example in which a captured image is played according to the image capturing method of FIG. 9. FIG. 10(*a*) is a display screen illustrating an image captured by the camera 121, and FIG. 10(*b*) is a display screen illustrating that a specific filter into which a surrounding atmosphere has been incorporated has been applied to the captured image. From FIG. 10(*b*), it can also be seen that the captured image is displayed, an audio file stored corresponding to the captured image is outputted through the audio output module 152, and various types of information 151A obtained when the image was captured are displayed on the display unit 151 at the same time.

Figure 11:
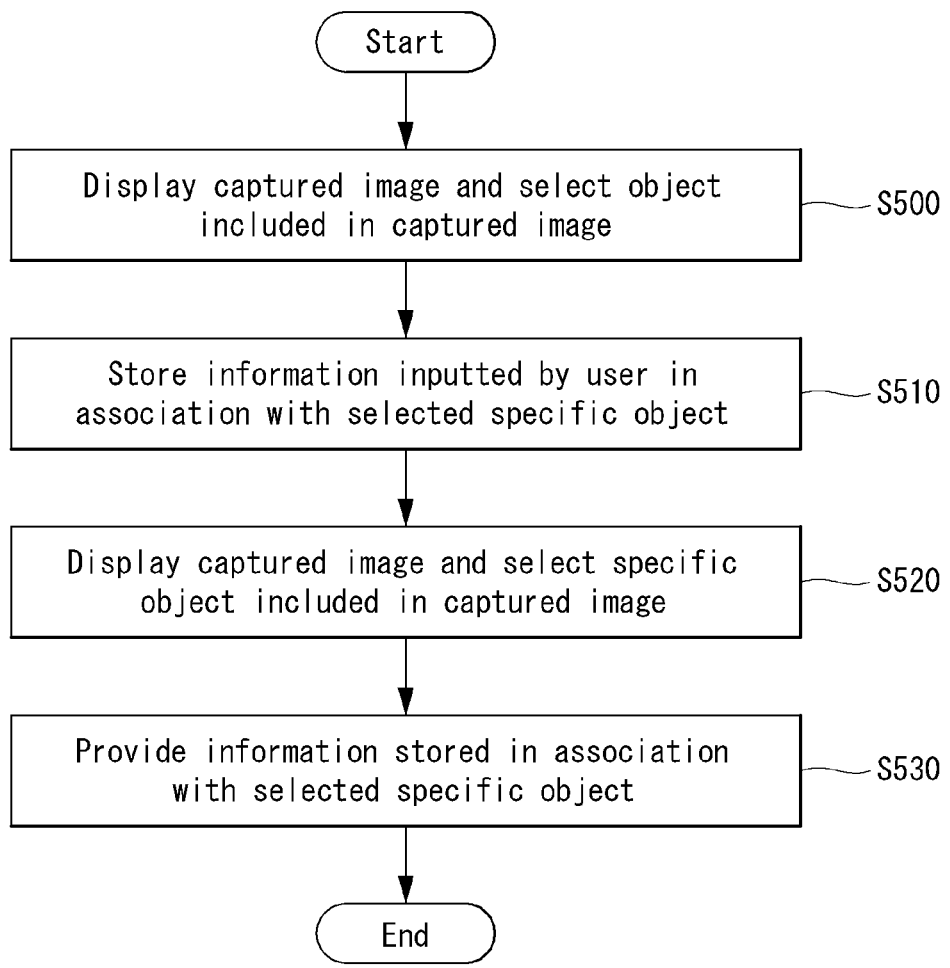
FIG. 11 is a flowchart illustrating an example of an image edit method that is performed in the mobile terminal according to an embodiment of the present invention.

FIG. 11 is a flowchart illustrating an example of an image edit method that is performed in the mobile terminal 100 according to an embodiment of the present invention. For reference, in FIG. 11, it is assumed that the mobile terminal 100 can perform an object recognition function for an image. The image edit method is described below with reference to related drawings.

An image captured by the camera 121 is stored in the memory 160, the captured image is displayed on the display unit 151, and an object included in the captured image is selected (S500). For example, if the display unit 151 is implemented using a touch screen, the controller 180 can select a specific object based on a touch to the specific object in the state in which the captured image has been displayed on the display unit 151.

In the state in which the specific object has been selected, a user inputs desired information for the specific object and performs an operation of storing the input information. In response thereto, the controller 180 stores the input information in association with the selected specific object (S510). The information input by the user can include text input by a user, specific data retrieved by a user over the Internet, link information corresponding to a specific side, and a keyword for an Internet search. However, the scope of the present invention is not limited to the aforementioned examples.

Thereafter, the captured image is displayed again, and the specific object included in the captured image is selected again (S520). In response thereto, the controller 180 provides a user with the information stored in association with the selected specific object (S530).

Figure 12:
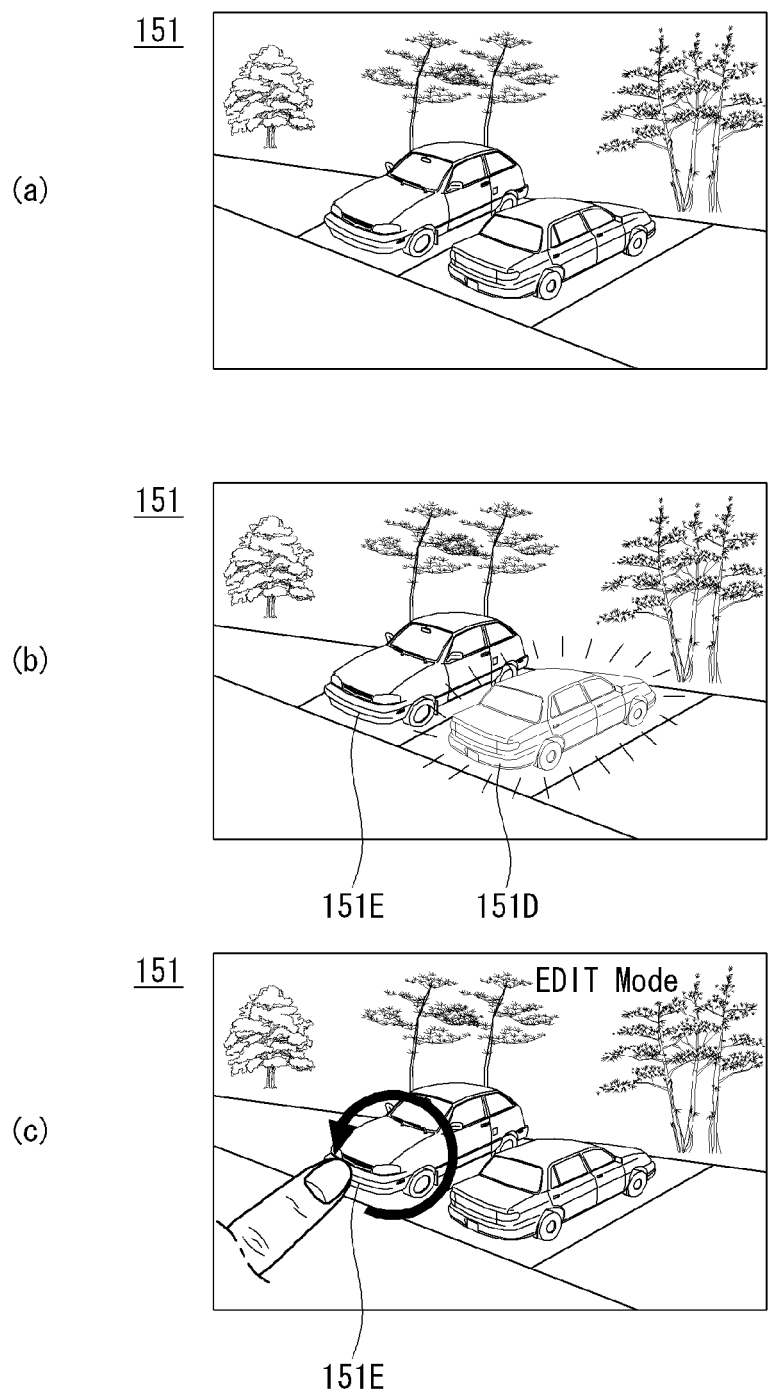
FIG. 12 is a diagram showing a process of performing the image edit method of FIG. 11 and results thereof.

FIG. 12 is a diagram showing a process of performing the image edit method of FIG. 11 and results thereof. In particular, FIG. 12(a) shows the original captured image. FIG. 12(b) shows that information input by a user is stored in association with a specific object 151D included in the captured image. The controller 180 can display the object 151D, associated with the information input by the user, and a different object 151E visually differently, as shown in FIG. 12.

FIG. 12(c) shows that a user selects the object 151E to which information will be input in an edit mode in which information can be input to the captured image. As shown in FIG. 12, the user can select the object 151E by means of a specific touch action for the object 151E to which the information will be input.

Figure 13:
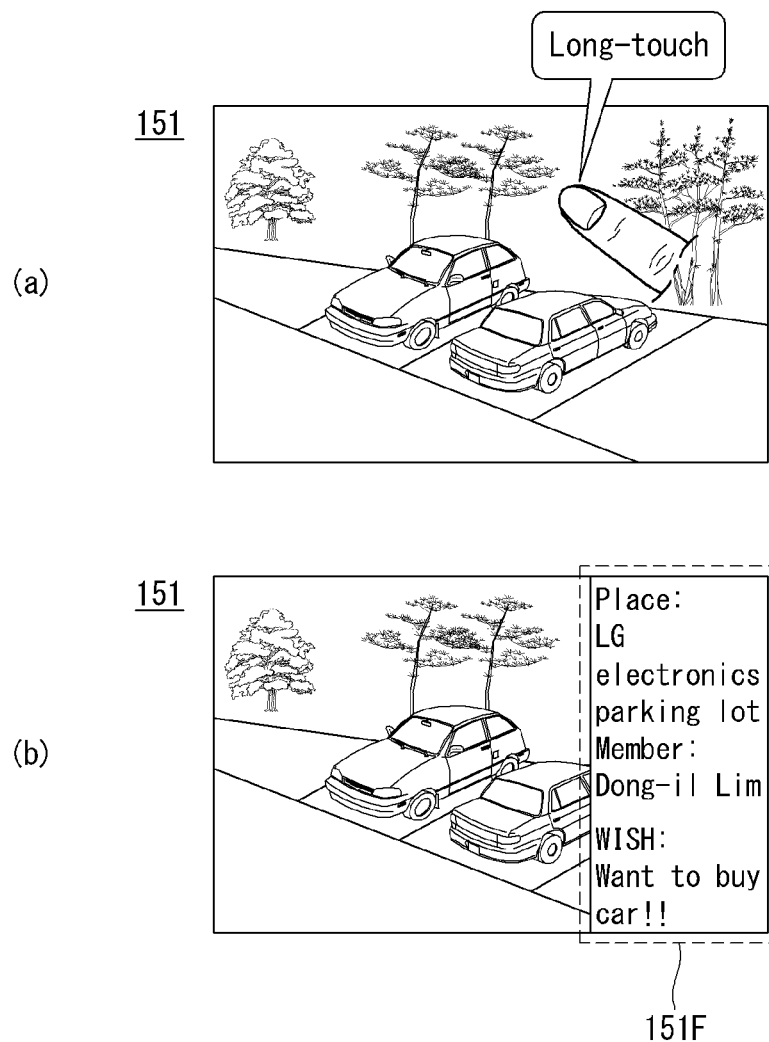
FIG. 13 is a diagram showing a process of inputting information for the entire captured image in the mobile terminal according to an embodiment of the present invention and results thereof.

FIG. 13 is a diagram showing a process of inputting information for the entire captured image in the mobile terminal 100 according to an embodiment of the present invention and results thereof. That is, as described above with reference to FIGS. 11 to 12, a user can selectively input information for each object included in a captured image and can also input information for the entire captured image.

FIG. 13(a) shows that a user activates an edit mode in which information for the entire captured image is input by long touching a region of the captured image. FIG. 13(b) shows that when a captured image is displayed after a user input information 151F for the captured image and stored the input information, the information 151F is provided to the user.

Figure 14:
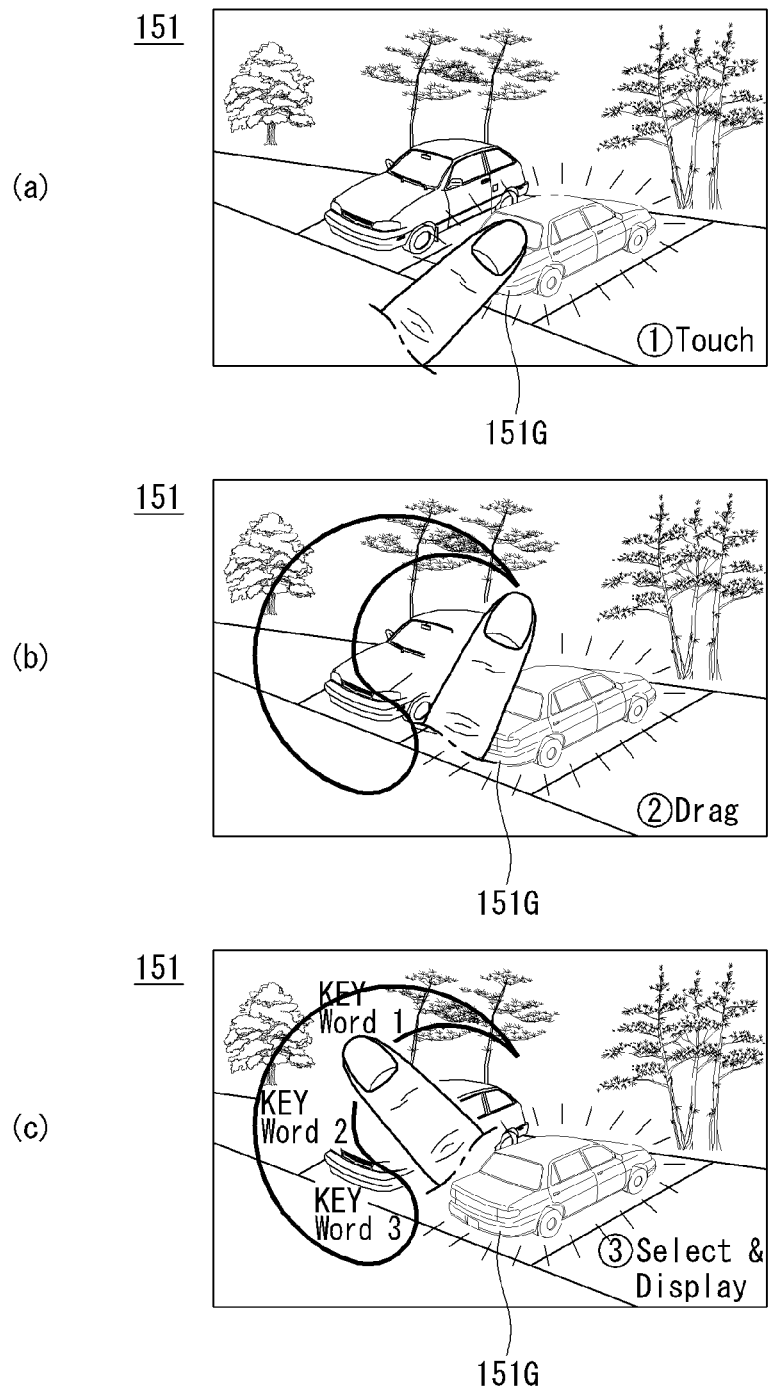
FIG. 14 is a diagram showing an example of a process of providing a user with information stored according to the image edit method of FIG. 11.

FIG. 14 is a diagram showing an example of a process of providing a user with information stored according to the image edit method of FIG. 11. In particular, FIG. 14(a) shows that a user selects a specific object 151G included in a captured image by long touching the specific object 151G. In response to the selection, the controller 180 displays the selected object 151G and another object visually differently, as shown in FIG. 14(a).

Thereafter, as shown in FIG. 14(b), the user performs a drag operation on the selected object 151G. In response thereto, the controller 180 provides the user with a list of keywords that have been input by the user in relation to the selected object 151G, as shown in FIG. 14(c).

When the user selects a specific keyword from the list of keywords, the controller 180 can provide the user with detailed information corresponding to the specific keyword. The detailed information corresponding to the specific keyword can be previously stored by the user.

Alternatively, the detailed information corresponding to the specific keyword can be information that has been searched for by the controller 180 over the Internet. For example, when the specific keyword is selected, the controller 180 can access the Internet through the wireless communication unit 110, search for an object selected based on the specific keyword, and provide the results of the search as information corresponding to the selected object.

FIG. 15 is a display screen illustrating an example in which information stored according to the image edit method of FIG. 11 is provided to a user. A user touches 'Vehicle Review' in a list of keywords for a specific vehicle 151G selected by the user in the state in which the list of keywords for the specific vehicle 151G has been displayed on the display unit 151. In response thereto, the controller 180 can search for sites that provide reviews for the specific vehicle 151G and provide the retrieved sites to the user as shown in FIG. 15(a).

FIG. 15(b) shows that although 'Vehicle Review' has been selected in the list of keywords for the selected specific vehicle 151G, the controller 180 can reduce a region in which a captured image is displayed, enlarge a region in which information about the retrieved sites is displayed, and provide a list of keywords to be retrieved in part of the display unit 151. Meanwhile, when the user touches the region in which the captured image is displayed in the state of FIG. 15(b), the controller 180 can switch the state of a screen to the state of FIG. 15(a), the state of FIG. 14(c), or the state of FIG. 12(a).

FIGS. 16 to 21 are display screens illustrating examples in which various types of information obtained based on images captured and stored by the mobile terminal 100 according to an embodiment of the present invention are provided to a user.

Figure 16:
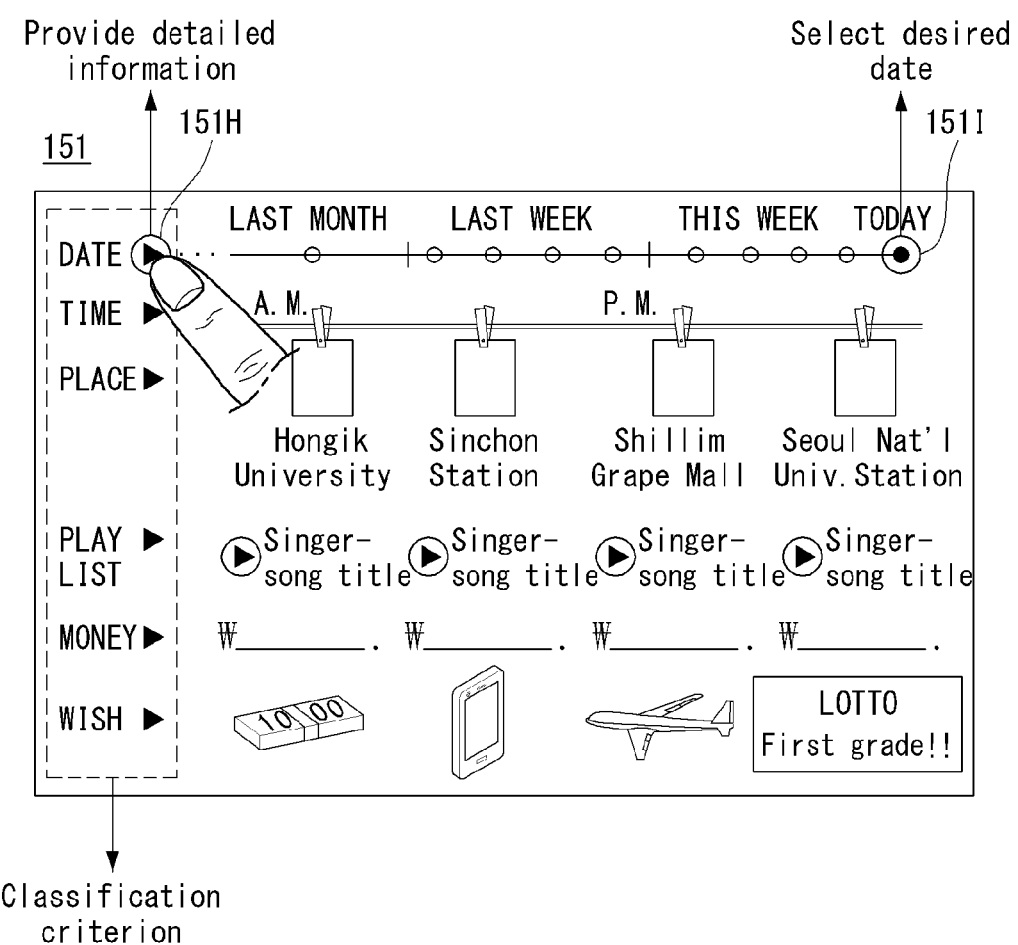
Figure 17:
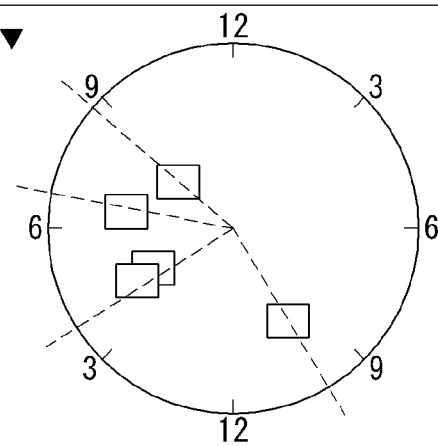

FIG. 16 shows a user interface in which pieces of information about images captured by the mobile terminal 100 are collected at once and provided. In particular, FIG. 16 shows that when a user touches and selects a button 151H corresponding to a specific classification criterion when the pieces of information about the captured images have been arranged according to a predetermined classification criterion, corresponding detailed information is provided. Furthermore, the user can be provided with an image captured on a specific date by touching a region 151I corresponding to the specific date.

FIG. 17(a) shows that when a date DATE is selected from the classification criteria shown in FIG. 16, a user interface is provided in which the date on which images were captured can be selected. FIG. 17(b) shows that when a time TIME is selected from the classification criteria shown in FIG. 16, information about images captured on the basis of a day is provided.

Figure 18:
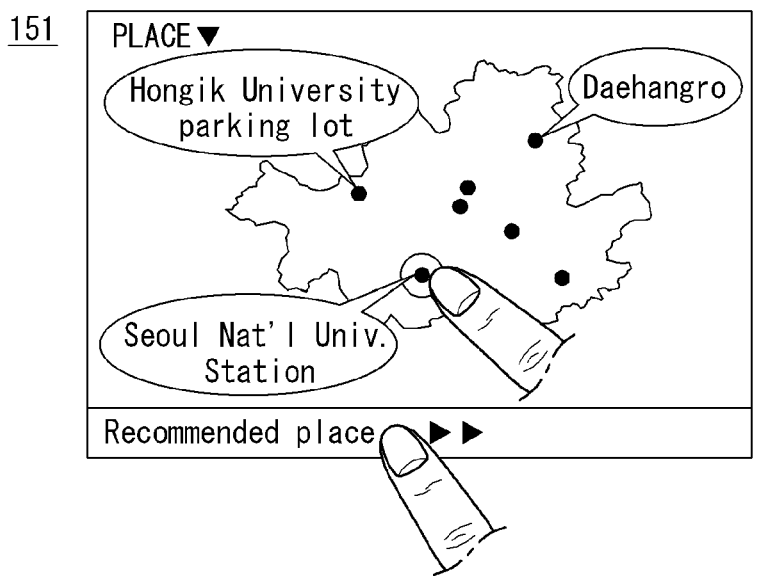
Figure 19:
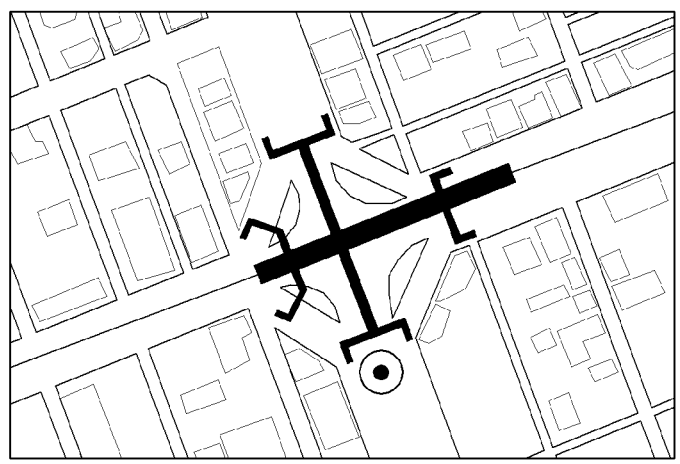

FIG. 18 shows that a place PLACE is selected from the classification criteria shown in FIG. 16, a user interface in which places where images were captured by a user are provided on a map is displayed on the display unit 151. When the user selects a specific place where a photo was taken in FIG. 18, the controller 180 can provided the user with a detailed map for the specific place, as shown in FIG. 19(a). Furthermore, when the user selects a recommended place in FIG. 18, the controller 180 can provide the user with detailed information about the recommended place, as shown in FIG. 19(b).

FIG. 20(a) shows that a play list PLAY LIST is selected from the classification criteria shown in FIG. 16, a user interface in which an audio list played nearby when a photo was taken is provided can be displayed on the display unit 151. This music list can be obtained according to the image capturing method of FIG. 4. In FIG. 20(a), a user selects a recommended music region. In response thereto, the controller 180 can display a recommended music menu on the display unit 151, as shown in FIG. 20(b).

FIG. 21(a) shows that when money MONEY is selected from the classification criteria shown in FIG. 16, a breakdown of expenditures is provided based on the date. FIG. 21(b) shows that when a wash list WASH is selected from the classification criteria shown in FIG. 16, items that a user wants to purchase are provided.

Figure 22:
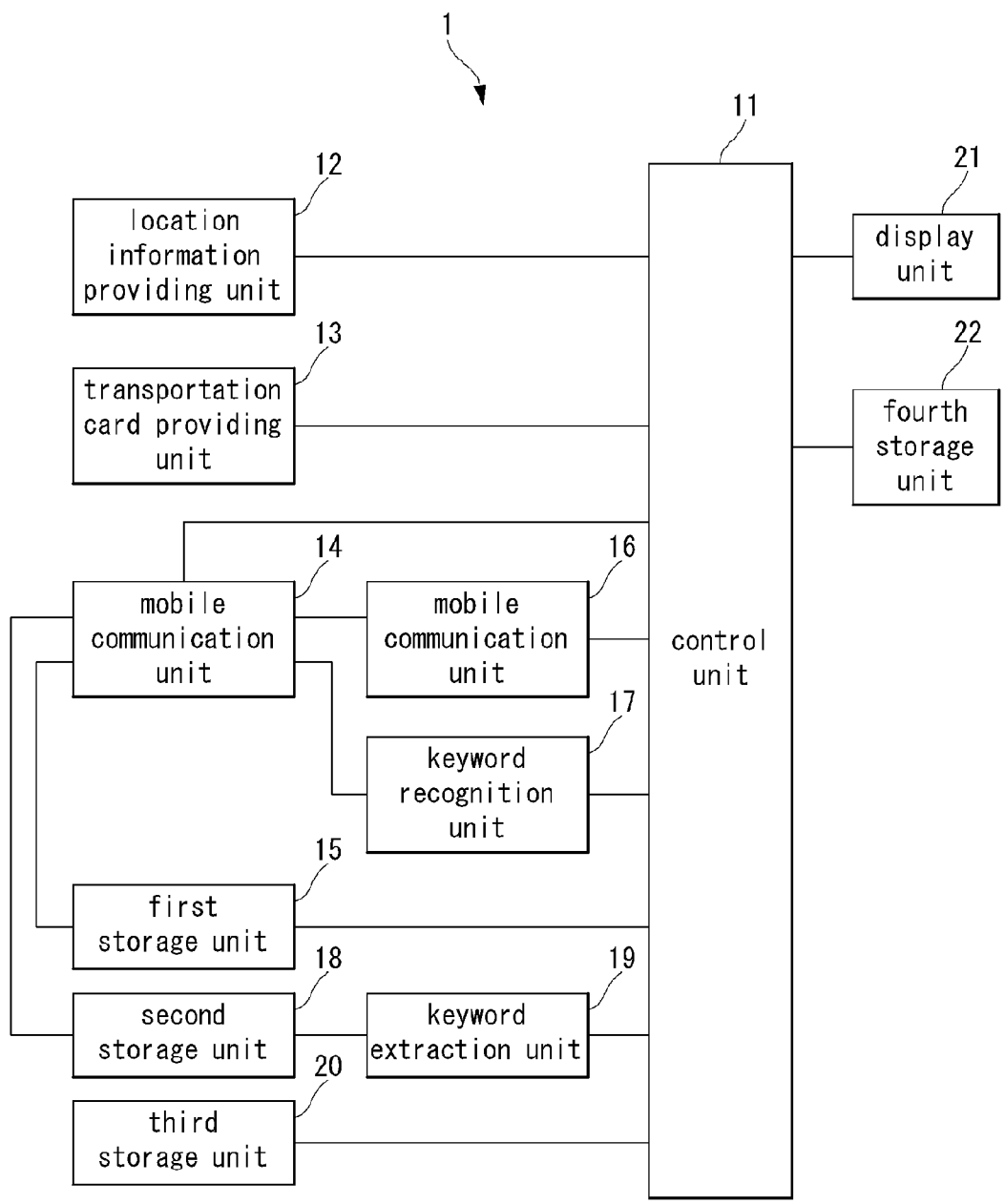
FIG. 22 is a diagram showing the construction of a diary providing apparatus in a mobile terminal in accordance with an embodiment of the present invention.

FIG. 22 shows the construction of a diary providing apparatus in a mobile terminal in accordance with an embodiment of the present invention. As shown in FIG. 22, the diary providing apparatus of the present invention is provided to a mobile terminal 1. The diary providing apparatus includes a control unit 11, a location information providing unit 12, a transportation card providing unit 13, a mobile communication unit 14, storage units 15, 18, 20, and 22, a voice tone recognition unit 16, a keyword recognition unit 17, a keyword extraction unit 19, and a display unit 21. Although only elements applicable for a description of the present invention has been shown in FIG. 22, it will be evident to those skilled in the art to which the present invention pertains that the mobile terminal 1 can include other elements in addition to the elements utilized for the description of the present invention.

The location information providing unit 12 provides the location of the mobile terminal 1, and it can be a Global Positioning System (GPS) module, for example. The location information providing unit 12 provides the control unit 11 with the location of the mobile terminal 1 periodically in a specific cycle or in response to a request from a user. Information about the location of the mobile terminal 1 can be provided in an address form, but this is only illustrative. Information about the location of the mobile terminal 1 can be provided in a form set by a user. For example, information about the location of the mobile terminal 1 can be provided in the form of a subway station or in the form of a place name.

The transportation card providing unit 13 provides a transportation card function by way of non-contact type Near Field Communication (NFC) using a specific frequency band. A method of providing a transportation card using NFC has been widely known in the art to which the present invention pertains, and thus a detailed description thereof is omitted. The mobile terminal 1 of the present invention can include an NFC module for the method of providing a transportation card using NFC. Transportation card use information about the transportation card providing unit 13 according to an embodiment of the present invention is provided to the control unit 11. That is, transportation card use information, such as the starting point, the arrival point, and the transfer point according to use of the transportation card, can be provided to the control unit 11.

The mobile communication unit 14 transmits and receives radio signals to and from one or more of a base station, an external terminal, and a server over a mobile communication network. The radio signals transmitted and received by the mobile communication unit 14 of the present invention includes a voice call signal and a message signal. The mobile communication unit 14 can store a call record (e.g., a sender or a recipient, a call time, and call duration) in the first storage unit 15 and store messages and a message record in the second storage unit 18 under the control of the control unit 11.

If the mobile communication unit 14 receives a voice call, the voice tone recognition unit 16 recognizes a voice tone of a user, recognizes a feeling of the user based on the recognized voice tone, and provides the recognized feeling to the control unit 11 in the form of feeling information. Furthermore, the keyword recognition unit 17 recognizes keywords in the voice call and provides the recognized keywords to the control unit 11 as keyword contents information.

If the mobile communication unit 14 receives a voice call as described above, the first storage unit 15 stores call information and provides the call information to the control unit 11. The call information includes a sender or a recipient, a call time, and call duration.

If the mobile communication unit 14 receives a message, the second storage unit 18 stores the message and information related to the message (i.e., message information). The message includes a text message and e-mail. In the case of e-mail, the mobile communication unit 14 may receive the e-mail, but the e-mail may be received over wireless Internet. In this case, the mobile terminal 1 may further include a communication unit (not shown) for providing the wireless Internet. The second storage unit 18 can provide message information to the control unit 11.

The keyword extraction unit 19 extracts keywords from a message (or text message or e-mail) stored in the second storage unit 18 and provides the extracted keywords to the control unit 11.

The third storage unit 20 stores calendar information written by a user, weather information, website use information, and media play information.

Calendar information can be provided to the mobile terminal 1 in the form of an application (i.e., calendar application). A user can register his schedule with the calendar application. The third storage unit 20 can store schedule information registered with this calendar application and provide the stored schedule information to the control unit 11. The schedule information includes dates and major schedules on corresponding dates.

Weather information can also be provided to the mobile terminal 1 in the form of an application (i.e., weather application). The third storage unit 20 can store daily weather on a corresponding date and provide the stored day weather to the control unit 11.

Website use information can be information about a specific website when a user accesses the specific website over a mobile communication network or a wireless Internet network using the mobile terminal 1. The third storage unit 20 can store the website use information and provide the stored website use information to the control unit 11. The website use information includes a site URL and a search word.

Media play information can be stored in the third storage unit 20 when a user plays multimedia using the mobile terminal 1 and then provided to the control unit 11. The mobile terminal 1 can also include a multimedia unit. The media play information can include the title of a sound source, a file name, etc. in the case of the sound source, for example.

The first to third storage units 15, 18, and 20 have been illustrated as being separate storage regions, but they may be a single storage region or may be formed of a greater or smaller number of storage regions.

The display unit 21 displays information processed by the mobile terminal 1. For example, if the mobile terminal 1 is a call mode, the display unit 21 displays a User Interface (UI) or a Graphic User Interface (GUI) related to the call. If the mobile terminal 1 is in a video call mode or a photographing mode, the display unit 21 can display a captured and/or received image or a UI and a GUI.

The display unit 21 of the present invention can display a written diary under the control of the control unit 11. The display unit 21 can include at least one of a Liquid Crystal Display (LCD), a Thin Film Transistor-Liquid Crystal Display (TFT-LCD), Organic Light-Emitting Diodes (OLED), a flexible display, and a 3-D display.

If the display unit 21 and a sensor for sensing a touch operation (i.e., a touch sensor) form a mutual layer structure (i.e., touch screen), the display unit 21 can also be used as an input device as well as an output device.

The control unit 11 receives information about the location of the mobile terminal 1 from the location information providing unit 12, transportation card use information from the transportation card providing unit 13, user feeling information from the voice tone recognition unit 16, voice call keyword contents information from the keyword recognition unit 17, call information from the first storage unit 15, message information from the second storage unit 18, message keyword information from the keyword extraction unit 19, and calendar information, weather information, website use information, and media play information from the third storage unit 20 and writes the diary of a user using the pieces of received information. That is, the control unit 11 can write a diary by incorporating a history of the mobile terminal 1 that has been daily used by the user into the diary.

The control unit 11 can write a diary in various ways. For example, the control unit 11 may write a diary in order of the time, according to categories, or by the preference level. A method of writing a diary can be determined in various ways.

FIG. 23A shows an example in which a diary was written in order of the time, and FIG. 23B shows an example in which the diary was written according to categories. FIGS. 23A and 23B show examples of forms that are provided to a user through the display unit 21.

In particular FIG. 23A, illustrates that the control unit 11 can write a diary in order of the time using mobile terminal use information. Furthermore, from FIG. 23B, it can be seen that the control unit 11 can write a diary according to categories, such as a location movement, the play of a media file, a telephone, a message, and schedule, using mobile terminal use information. The examples of FIGS. 23A and 23B are only illustrative, and embodiments of the present invention are not limited to the aforementioned examples.

The control unit 11 can store a diary, written as described above, in the fourth storage unit 22 and may display the written diary on the display unit 21 so that a user can read the diary as shown in FIGS. 23A and 23B. In FIGS. 23A and 23B, the diary has been illustrated as being written in the same color. For example, however, pieces of information provided by the elements may be written in different colors (e.g., red) or may be provided in a hyperlink form.

Meanwhile, the control unit 11 may store the written diary in the fourth storage unit 22 according to categories. If the diary is stored in the fourth storage unit 22 according to categories, the control unit 11 can control the display unit 21 so that the display unit 21 displays a summary by the category.

Figure 24:
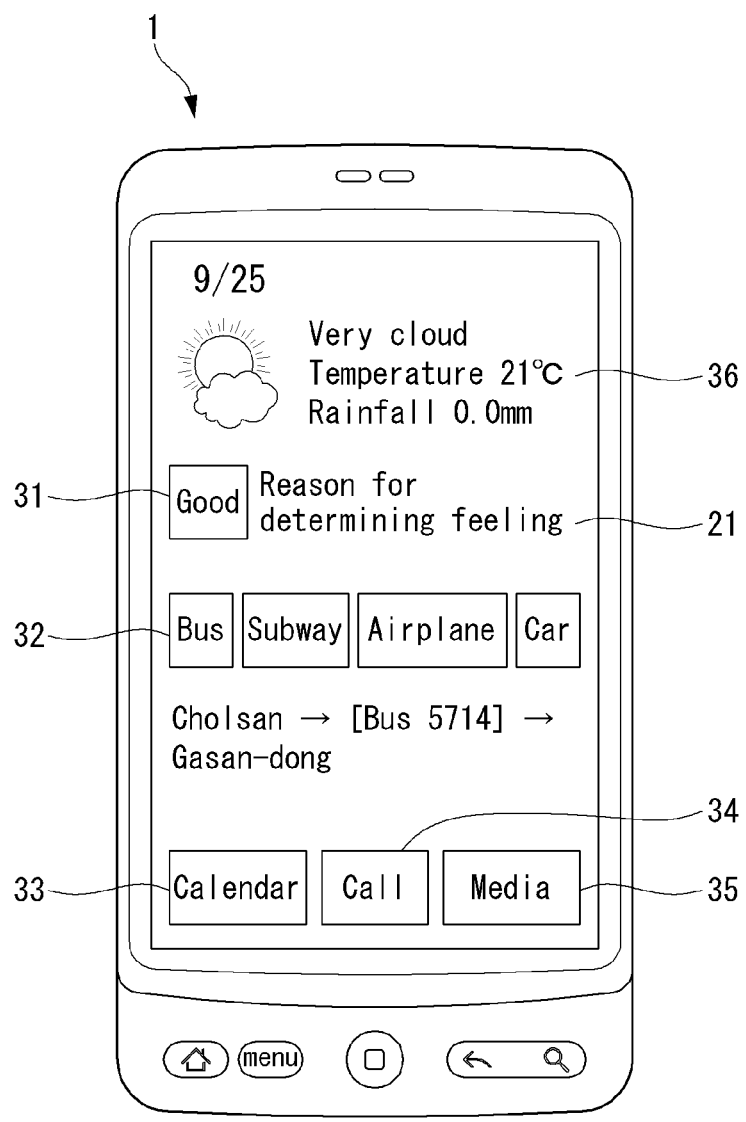
FIG. 24 is a diagram showing an example in which a controller controls a display unit so that information about the summary of a diary is displayed.

FIG. 24 shows an example in which the control unit 11 controls the display unit 21 so that information about the summary of a diary is displayed. As shown in FIG. 24, an icon 31 indicative of feeling information, an icon 32 indicative of transportation card use information, an icon 33 indicative of calendar information, an icon 34 indicative of call information, an icon 35 indicative of media play information, and an icon 36 indicative of weather information can be displayed on the display unit 21 of the mobile terminal 1.

When a user selects an icon, the control unit 11 can display a history of diaries for a corresponding category. In the case of the transportation card use information 32, an icon can be individually generated by the transportation. When a user selects transportation to be read, transportation card use information for the selected transportation can be displayed in a diary form.

As described above, in accordance with the present invention, a diary including natural sentences can be generated by processing mobile terminal use information, and the diary can be written in the form of a daily file. Accordingly, there is an advantage in that a user's daily schedule can be generated in a diary form.

Furthermore, the mobile terminal according to an embodiment of the present invention can provide a function of matching information, obtained when capturing an image using the camera, with the captured image and storing the matched information.

Furthermore, the mobile terminal according to an embodiment of the present invention can provide a function of adding information, desired by a user, to an object included in a captured image.

Furthermore, the mobile terminal according to an embodiment of the present invention can perform a search function for an object included in a stored image when the object is selected by a user.

The exemplary embodiments of the present invention have been described above with reference to the drawings. However, the present invention is not limited to the exemplary embodiments, but a person having ordinary skill in the art can modify the present invention in various ways. Accordingly, the true scope of the invention should be determined by the following claims.

What is claimed is:

1. A mobile terminal, comprising:
a display unit;
a memory configured to store mobile terminal use information including schedule information, weather information, website use information, and media play information;
a position information module configured to receive location information of the mobile terminal;
a local area communication module configured to receive transportation card use information of the user through transportation card function using near field communication; and
a mobile communication module configured to receive information of a voice call and a message; and
a controller configured to:
  select a specific date;
  obtain, via the position information module, the location information, via the local area communication module, the transportation card use information, and, via the mobile communication module, the received information of the voice call and the message during the selected specific date;
  extract a feeling of the user based on a voice tone of the voice call, the voice call information including a recipient, a call time and call duration from the received voice call, the message information including keywords from the received message, the schedule information including major schedules of the specific date, the weather information of the specific date, the website use information including a site URL and a search word, and the media play information including a title of a sound source and a file name from the memory;
  generate a user diary of the specific date based on the extracted feeling, the extracted voice call information, the extracted message information, the extracted schedule information, the extracted weather information, the extracted website use information, and the extracted media play information;
  generate icons corresponding to the location information, the transportation card use information, the feeling, the voice call information, the message information, the schedule information, the weather information, the website use information, and the media play information;
  cause the display unit to display the generated icons corresponding to contents of the generated user diary of the specific date; and
  cause the display unit to display detail information corresponding to a specific icon of the icons in response to an input of the specific icon.

2. The mobile terminal of claim 1, wherein the memory comprises:
a first memory configured to store call information about the voice call;
a second memory configured to store message information about the message; and
a third memory configured to store calendar information, the weather information, the website use information, and the media play information.

3. The mobile terminal of claim 1, wherein the controller is further configured to control the display unit so that the diary is displayed in order of a time.

4. The mobile terminal of claim 1, wherein the controller is further configured to control the display unit so that the diary is displayed according to categories based on information.

5. The mobile terminal of claim 1, further comprising:
a camera configured to capture an image; and
a microphone configured to obtain sound information,
wherein the controller is further configured to:
    capture an image using the camera, search for an audio file corresponding to sound information obtained through the microphone when capturing the image using the camera;
    set information related to the searched audio file as an audio file corresponding to the captured image;
    store the captured image with the audio file as the mobile terminal use information; and
    output the audio file to an audio output module when displaying the diary including the captured image on the display unit.

6. The mobile terminal of claim 5, wherein the controller is further configured to search the memory or to access an Internet through the wireless communication unit and search for the audio file corresponding to the obtained sound information.

7. The mobile terminal of claim 5, wherein the controller is further configured to:
    search the memory for the audio file corresponding to the obtained sound information; and
    access an Internet through a wireless communication unit and search for the audio file corresponding to the obtained sound information, when the audio file corresponding to the obtained sound information is not searched in the memory.

8. The mobile terminal of claim 5, wherein the controller is further configured to search for the audio file corresponding to the captured image based on information about a location of the mobile terminal when the audio file corresponding to the obtained sound information is not searched.

9. The mobile terminal of claim 5, wherein the controller is further configured to access an Internet though a wireless communication unit and search for an audio file previously registered based on the location of the mobile terminal.

10. The mobile terminal of claim 1, further comprising:
a camera configured to capture an image; and
a microphone configured to obtain voice information,
wherein the controller is further configured to:
    convert the voice information, received through the microphone, into text when capturing the image using the camera;
    match the converted text with the captured image;
    store the matched text along with the captured image, and the captured image with the audio file as the mobile terminal use information in the memory; and
    display the stored text on the display unit along with the captured image when displaying the diary including the captured image on the display unit.

11. The mobile terminal of claim 10, wherein the controller is further configured to determine a size of the converted text based on a volume of the received voice information.

12. The mobile terminal of claim 10, wherein the controller is further configured to:
    check a place where the voice information was obtained; and
    determine a location of the display unit where the stored text is to be displayed based on the place where the voice information was received when displaying the captured image.

13. The mobile terminal of claim 10, wherein the controller is further configured to:
    convert the received voice information into the text based on a time when the voice information was received and store the converted text; and
    display the stored text on the display unit in order that voice information corresponding to the stored text was received when displaying the captured image.

14. The mobile terminal of claim 10, wherein the memory is further configured to:
    store a specific image and a keyword list for a specific object included in the specific image;
    display the keyword list for the specific object on the display unit when the specific image is output through the display unit and the specific object is selected;
    perform a search related to the specific object using the specific keyword when the specific keyword is selected from the keyword list; and
    display results of the search on the display unit.

* * * * *